US011346281B2

(12) United States Patent
Baker et al.

(10) Patent No.: US 11,346,281 B2
(45) Date of Patent: May 31, 2022

(54) DUAL SCHEDULE FLOW DIVIDER VALVE, SYSTEM, AND METHOD FOR USE THEREIN

(71) Applicants: Carthel C. Baker, Daytona Beach, FL (US); Brett Flannery, Poplar Grove, IL (US); Robert Mazza, Houston, TX (US); Austin Wade Mueller, Clinton, WI (US); Michael L. Hahn, Fort Collins, CO (US); Grzegorz Pelc, Cracow (PL)

(72) Inventors: Carthel C. Baker, Daytona Beach, FL (US); Brett Flannery, Poplar Grove, IL (US); Robert Mazza, Houston, TX (US); Austin Wade Mueller, Clinton, WI (US); Michael L. Hahn, Fort Collins, CO (US); Grzegorz Pelc, Cracow (PL)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 16/999,321

(22) Filed: Aug. 21, 2020

(65) Prior Publication Data

US 2022/0056848 A1 Feb. 24, 2022

(51) Int. Cl.
*F02C 7/232* (2006.01)
*F02C 7/228* (2006.01)
(Continued)

(52) U.S. Cl.
CPC .............. *F02C 7/232* (2013.01); *F02C 7/228* (2013.01); *F02C 9/263* (2013.01); *F02C 9/34* (2013.01);
(Continued)

(58) Field of Classification Search
CPC .......... F02C 7/232; F02C 7/228; F02C 9/263; F02C 9/34; F02C 7/222; F05D 2240/35; F05D 2270/31; F23K 5/06; F23R 3/346
See application file for complete search history.

(56) References Cited

U.S. PATENT DOCUMENTS 4,491,272 A * 1/1985 Bradley ................. F23D 11/26
239/104
4,649,950 A * 3/1987 Bradley ................. B01D 35/04
137/549
(Continued)

FOREIGN PATENT DOCUMENTS

EP 2 778 372 A2 9/2014

*Primary Examiner* — Gerald L Sung
*Assistant Examiner* — Rene D Ford
(74) *Attorney, Agent, or Firm* — Reinhart Boerner Van Deuren P.C.

(57) ABSTRACT

A passive flow splitting system for use in a turbine engine control system to provide split fuel flow to two fuel manifolds to supply primary and secondary fuel injectors for the particular combustion zones thereof utilizing intentionally different split ratios dependent on ascending or descending combustion fuel flow is provided. The system includes a passive fuel divider valve (FDV) that includes a primary piston and a secondary piston. The primary piston is moveable independently from the secondary piston during a portion of its stroke, and is hydro-locked to the secondary piston during another portion of its stroke. An ecology valve is also provided to purge the fuel from the primary and/or secondary manifolds during different modes of operation. A transfer valve is included to control the position of ecology piston of the ecology valve.

16 Claims, 6 Drawing Sheets

(51) Int. Cl.
  *F02C 9/26* (2006.01)
  *F02C 9/34* (2006.01)
  *F02C 7/22* (2006.01)
  *F23K 5/06* (2006.01)
  *F23R 3/34* (2006.01)

(52) U.S. Cl.
  CPC .......... *F02C 7/222* (2013.01); *F05D 2240/35* (2013.01); *F05D 2270/31* (2013.01); *F23K 5/06* (2013.01); *F23R 3/346* (2013.01)

(56) References Cited

U.S. PATENT DOCUMENTS

| | | | | |
|---|---|---|---|---|
| 4,655,912 A | * | 4/1987 | Bradley | F02C 9/263 210/133 |
| 4,726,396 A | * | 2/1988 | Bradley | F02C 9/263 137/541 |
| 4,938,418 A | * | 7/1990 | Halvorsen | F23D 11/24 239/5 |
| 5,442,922 A | * | 8/1995 | Dyer | F02C 7/228 60/739 |
| 5,916,126 A | | 6/1999 | Szillat et al. | |
| 2001/0025482 A1 | * | 10/2001 | Futa, Jr. | F02C 7/228 60/39.281 |
| 2002/0059799 A1 | * | 5/2002 | Lavie | F02C 7/232 60/714 |
| 2003/0093998 A1 | * | 5/2003 | Michau | F23K 5/147 60/740 |
| 2009/0173810 A1 | * | 7/2009 | Rodrigues | F02C 7/232 239/533.3 |
| 2010/0037612 A1 | | 2/2010 | Futa et al. | |
| 2013/0043331 A1 | * | 2/2013 | Snodgrass | F23R 3/343 239/574 |
| 2013/0055719 A1 | * | 3/2013 | Ogata | F23K 5/06 60/740 |
| 2015/0007572 A1 | * | 1/2015 | Pousseo | F02C 7/222 60/740 |
| 2015/0292412 A1 | * | 10/2015 | Rodrigues | F23K 5/147 60/741 |
| 2015/0337736 A1 | * | 11/2015 | Vertenoeuil | F02C 7/232 60/734 |
| 2019/0257251 A1 | * | 8/2019 | Godel | F02C 7/264 |
| 2019/0285004 A1 | * | 9/2019 | Hill | F01D 25/18 |
| 2020/0362760 A1 | * | 11/2020 | Morenko | F02C 7/228 |
| 2020/0362761 A1 | * | 11/2020 | Shenouda | F02C 7/222 |

* cited by examiner

DUAL SCHEDULE FLOW DIVIDER VALVE, SYSTEM, AND METHOD FOR USE THEREIN

FIELD OF THE INVENTION

This invention generally relates to fuel flow distribution systems, and more particularly to split fuel flow distribution systems for turbine engines.

BACKGROUND OF THE INVENTION

Split flow control for modern turbine engines is typically used to control the fuel flow to two or more combustion zones in the engine that are fed via a number of fuel nozzles supplied from primary and second manifolds. While numerous control architectures are available, many such systems use a simple flow divider value for this purpose. One such simply split flow control valve is shown in FIG. 6 in an operating (full fuel flow), primary flow only (reduced fuel flow), and shutdown mode of operation (no fuel flow) from the left to the right. Such simple valves operate to equalize the pressure related to total fuel flow in order to control the fuel flow of two flow circuits that feed a plurality of fuel nozzles through the independent primary and secondary manifolds.

As the fuel pressure from the fuel control system is reduced from the primary operating condition shown on the left of FIG. 6, the reduced fuel pressure allows the main split flow control piston to move upward under force of the main control spring. This movement serves to reduce, and then eliminate, secondary flow to the secondary manifold as shown in the middle illustration of FIG. 6. As the pressure is reduced still further, the primary flow is reduced as the piston continues to move upward to balance the fuel pressure with the spring force, until even the primary fuel flow is stopped in the shutdown mode shown on the rightmost illustration of FIG. 6.

While not present in all split flow systems, the valve of FIG. 6 illustrates the presence of an ecology piston that is held on an ecology valve seat by a secondary spring during the operating modes. However, once the shutdown mode is achieved by full stroke of the main split flow control piston, the ecology piston is lifted from its seat to drain the primary and secondary manifolds to prevent coking of the fuel that might otherwise remain therein. The fuel from these manifolds may flow into an ecology valve for ready supply back to the manifolds to ensure that they are primed for controlled flow from the fuel control system once engine operation is again commanded.

As will now be apparent, such systems control the flow split by metering a portion of the total flow in one of the fuel manifolds. The remainder of the total flow is passed down to the other manifold. This method of fuel flow split control is insensitive to manifold pressures, thus fuel flow split accuracy is not impacted by downstream manifold and nozzle variation. Thus, the total engine fuel flow split can be accurately maintained over a wide range of operating conditions.

While perfectly suitable in many turbine engine installations, in some applications it is necessary to operate at low power for an extended period of time. Unlike in the valve shown in FIG. 6 that only opens the ecology valve to purge both manifolds during shutdown, in this low power mode it is desired to purge the secondary manifold while continuing to operate from the primary manifold. This is desired in order to enrich the primary circuit, to improve flame out margin, and to ensure the secondary nozzles do not coke up due to continued presence of fuel during periods of continuing operation in the low power mode.

The problem is, however, that while the low power mode of operation only needs fuel to be supplied by the primary manifold, in a commanded second key operating mode this same fuel flow rate is required to be supplied to the engine from both primary and the secondary manifold. In other words, the two modes of operation, to with the extended operating low power mode and the commanded second key operating mode, each use essentially the same fuel flow to the engine, but use different split ratios depending on whether the engine is coming from a low power condition or a high power condition. Furthermore in the extended operating condition the secondary manifold must be purged whereas in the commanded second key operating mode the secondary manifold must remain primed with fuel.

In a fuel system technical implementation, this requirement for an intentional hysteresis loop creates an issue for a passive flow divider valve, without adding additional features to enable the two different modes at a single flow rate. In one such implementation a hysteresis can be built into the valve logic, and software can be written into the computer logic to enable the desired conditions. However, such active computer driven control increases the complexity and cost of the fuel flow control system.

In view of the above, what is needed is a passive split flow divider valve solution that, in a first condition, is capable of flowing fuel to both manifolds when an idle condition is commanded from a high power operating condition, but that, in a second condition, flows fuel only to the primary manifold when the idle condition is commanded from low power operating condition. That is, the second condition provides the same idle condition flow rate as the first condition but with the secondary manifold closed and purged. Such a passive split flow valve solution offers better metrics for system cost, weight, and reliability compared to a solution that requires electronics to provide the different split ratios dependent on ascending or descending combustion fuel flow.

Embodiments of the present invention provide such a passive solution. These and other advantages of the invention, as well as additional inventive features, will be apparent from the description of the invention provided herein.

BRIEF SUMMARY OF THE INVENTION

In one aspect, embodiments of the present invention provide a passive flow splitting system. In particular embodiments such passive flow splitting system is utilized in a turbine engine control system to provide split fuel flow to two fuel manifolds to supply primary and secondary fuel injectors for the particular combustion zones. Preferably, embodiments provide the ability to split fuel to the primary and secondary manifolds to supply the injectors at an intentionally different split ratio dependent on ascending or descending combustion fuel flow.

In one embodiment a passive fuel divider valve (FDV) is utilized that includes a primary piston and a secondary piston. The primary piston is moveable independently from the secondary piston to meter fuel flow to the primary manifold of the engine fuel supply system in one embodiment, and is biased away from the secondary piston. The secondary piston meters fuel flow to the secondary manifold of the engine fuel supply system in one embodiment, and is biased to prohibit such flow. The primary piston strokes with increasing fuel pressure to meter such flow to the primary manifold, and contacts the secondary piston with increasing fuel pressure to cause it to meter flow to the secondary manifold. Preferably, the primary piston and the secondary piston are hydro-locked during such metering.

In a particular embodiment, an ecology valve is provided to purge the fuel and ecology it from the primary and/or secondary manifolds. The control for such ecology valve is provided in one embodiment by a transfer valve. This transfer valve senses fuel pressure supplied to the secondary manifold by the FDV in order to alternatively supply inlet pressure or fuel pump operating pressure to the control side of the ecology piston of the ecology valve.

In a preferred embodiment, the FDV is configured to provide a low power mode of operation that only supplies fuel to the primary manifold. The FDV is also configured to provide the same fuel flow rate as in the low power mode in a commanded second key operating mode that supplies fuel to the engine from both the primary and the secondary manifolds. With such configuration of the FDV, the two modes of operation, to with the low power mode and the commanded second key operating mode, each use essentially the same fuel flow to the engine, but use different split ratios depending on whether the engine is coming from a low power condition or a high power condition, such differences defining a flow rate hysteresis loop enabling such operations in the different modes.

In preferred embodiments, the secondary manifold is purged while continuing to operate from the primary manifold in the low power mode in order to enrich the primary circuit, to improve flame out margin, and to ensure the secondary nozzles do not coke up due to continued presence of fuel during periods of continuing operation in the low power mode.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
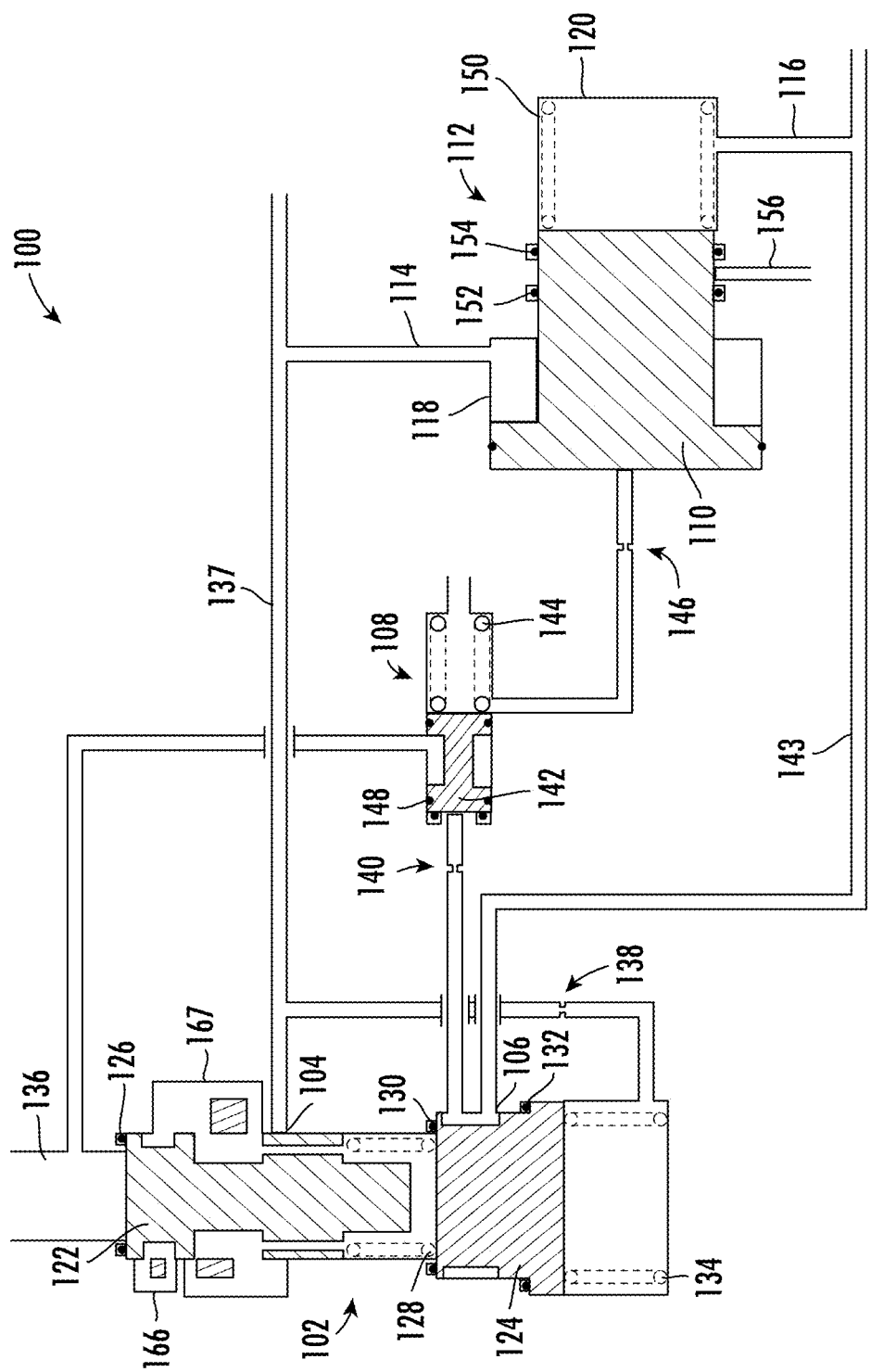
FIG. 1 is a simplified fuel flow schematic illustrating a shutdown condition of a split fuel flow system constructed in accordance with one embodiment of the present invention.
Figure 2:
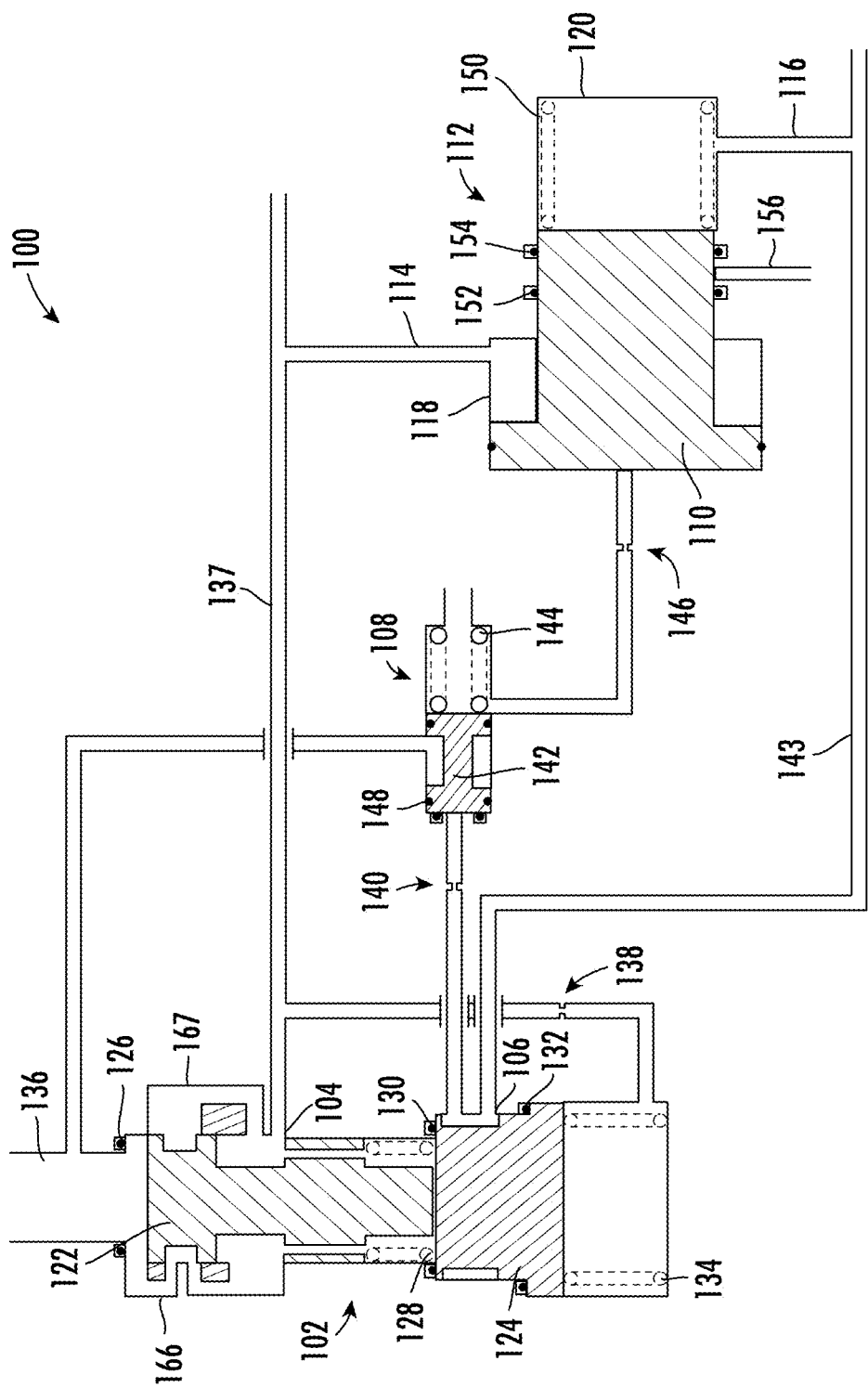
FIG. 2 is a simplified fuel flow schematic illustrating a primary/low power operating mode of the split fuel flow system of FIG. 1.
Figure 3:
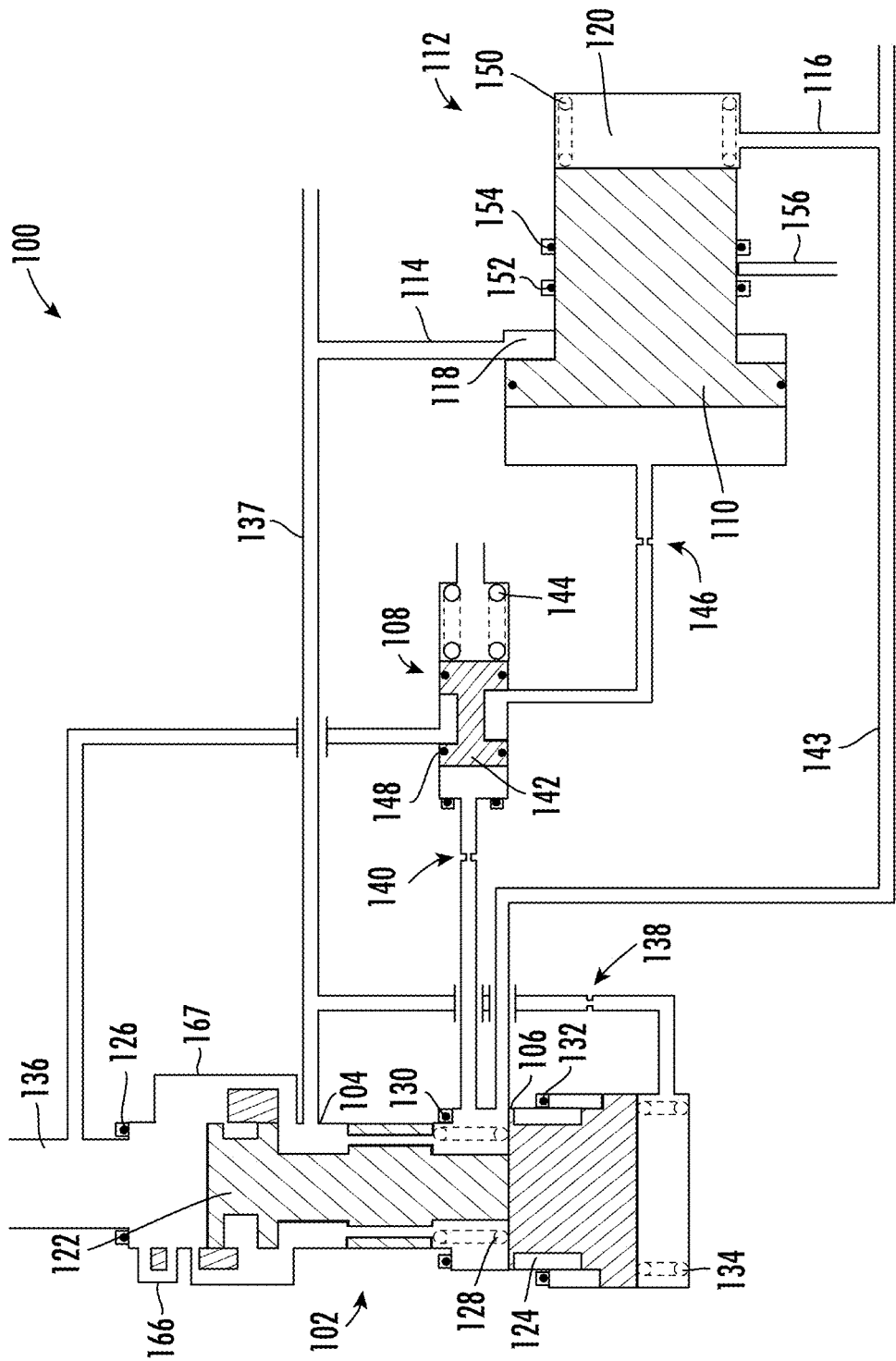
FIG. 3 is a simplified fuel flow schematic illustrating a full operating mode of the split fuel flow system of FIG. 1.

Turning now to the drawings, there is illustrated in FIGS. 1-3 a passive split flow fuel control system constructed in accordance with an embodiment of the present invention. Such a system is capable of providing different split ratios to the primary and the second fuel manifolds of a multi-zone turbine engine dependent on ascending or descending combustion fuel flow. As will be discussed in detail hereinbelow, use of the split fuel flow divider valve provides an intentional hysteresis loop that, in a first condition, is capable of flowing fuel to both manifolds when an idle condition is commanded from a high power operating condition, but that, in a second condition, flows fuel only to the primary manifold when the idle condition is commanded from low power operating condition. That is, the second condition provides the same overall idle flow rate as the first condition but with the secondary manifold closed and purged.

However, it should be noted that while the following will describe various features and advantages provided by embodiments of the present invention in the context of fuel flow to a turbine engine with different combustion zones supplied by primary and secondary manifolds, such embodiments and operating environments should be taken by way of example and not by way of limitation.

As illustrated in each of FIGS. 1-3, an embodiment of the split flow fuel control system 100 of the present invention includes a flow dividing valve (FDV) 102, which schedules both the primary 104 and secondary 106 manifold port openings as a function of total flow. A transfer valve 108 is included in the illustrated embodiment, which controls the charge/discharge of the double diameter ecology piston 110 of ecology valve 112. This ecology valve 112 is fluidly connected to, and therefore is capable of reservoiring the fuel in, both the primary and secondary manifolds (not shown). This reservoiring is accomplished by fluidly connecting the primary manifold via flow line 114 to purge volume 118 of the ecology valve 112, and by fluidly connecting the secondary manifold via flow line 116 to purge volume 120 of the ecology valve 112.

The FDV 102 includes a primary piston 122 and a secondary piston 124. The primary piston 122 is biased upward and against a first seal 126 by a first spring 128, and the secondary piston 124 is biased upward and against a second seal 130 and a third seal 132 by a second spring 134. In relative terms, the force of spring 128 is lighter than that of spring 134. As will be discussed more fully below with reference to FIG. 2, as the inlet fuel pressure is increased at the inlet 136 of the FDV 102, the primary piston 122 is forced downward against the force of spring 128 to meter a flow of fuel to the primary manifold from primary manifold port opening 104 via flow line 137. This primary manifold fuel pressure is also provided through a restriction 138 to the back side of the secondary piston 124.

As the fuel pressure continues to increase at the inlet 136, the primary piston 122 will continue to move downwardly and will eventually contact the secondary piston 124. At such point the force of the spring 134 will need to be overcome in order to continue to stroke the, now hydro-locked, combined, primary piston 122 and secondary piston 124. Such movement will first unseat the secondary piston 124 from the second 130 and third 132 seals. Continued movement of the secondary piston 124 will result in the fuel pressure being provided through restriction 140 to the transfer valve 108, and the metering of fuel flow to the secondary manifold from secondary manifold port opening 106 via flow line 143 as shown in FIG. 3.

The capability to run the engine for extended durations with fuel flow only supplied to the primary manifold requires the system to purge the secondary manifold while fuel flow to the primary is maintained. This is accomplished in the illustrated embodiment through operation of the switching transfer valve 108. This transfer valve 108 senses inlet pressure to the secondary piston 124 through restriction 140 in order to control the position of its piston 142 against the force of spring 144 (and the inlet pressure of the fuel control system's fuel pump, i.e. low pressure). The positioning of piston 142 operates to control the dual purge volume ecology piston 110 by connecting it through restriction 146 either to the fuel control system inlet pressure ($P_{inlet}$) as shown in FIG. 1 or to the fuel control system's pressure as shown in FIG. 3. If the fuel pressure provided is less than the force of spring 150 acting on the other side of piston 110, the ecology valve 112 will be as shown in FIG. 1, and if greater as shown in FIG. 3. The ecology piston 110 is in the charged position in FIG. 3 when secondary flow via line 143 is on, and in the purge position in FIG. 1 when secondary flow is off. Drop tight sealing between the primary and secondary manifolds is provided to prevent coking in the secondary manifold. This is accomplished with a dual face seal configuration discussed above integral to the FDV 102 and a single face seal 148 in the transfer valve 108.

Having now discussed the components of an embodiment of the system 100 of the present invention, attention is now directed back to FIG. 1 illustrating the shutdown mode. In this mode, the FDV 102 is closed, providing a drop tight seal to the secondary manifold from either the primary manifold or upstream pressure. The transfer valve 108 is positioned to provide $P_{inlet}$ pressure to the inlet of the double diameter ecology piston 110, which pressure is less than the force of spring 150 keeping the piston 110 biased in the un-charged state. This uncharged state provides ecology of both the primary and secondary manifolds, i.e. it purges the fuel that would otherwise remain in these two manifolds and stores it in each of the two ecology volumes of the ecology valve 112. The ecology piston 110 provides dual dynamic sealing via seals 152, 154 bracketing overboard drain 156 which seals the secondary manifold line from primary pressure.

Figure 4:
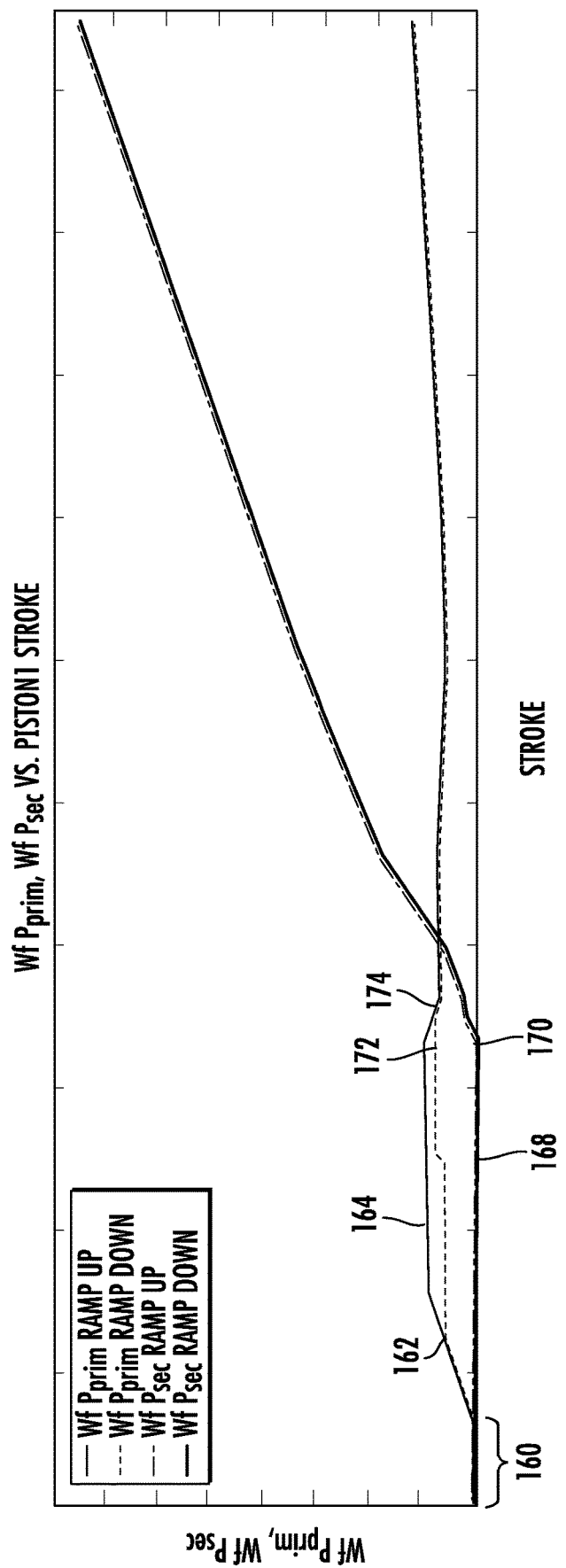
FIG. 4 is a simplified graphical illustration of nominal primary and secondary fuel flow versus split flow divider valve stroke.
Figure 5:
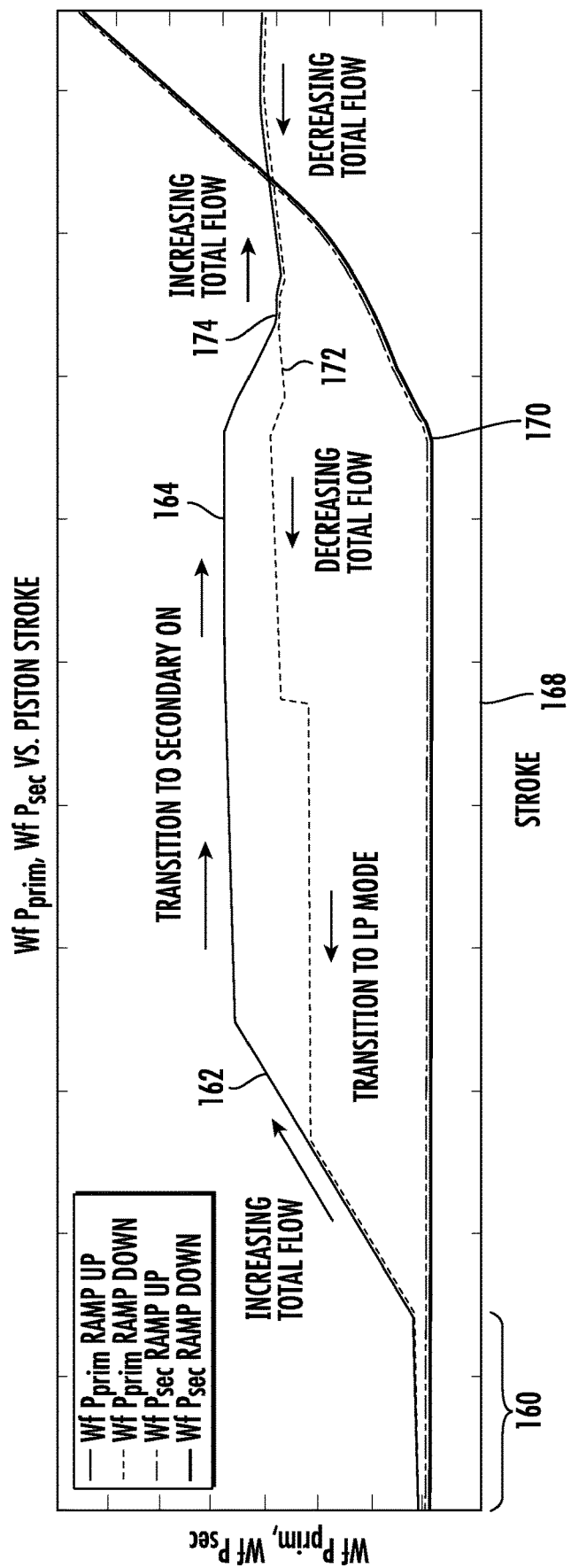
FIG. 5 is an enlarged graphical illustration of the hysteresis region of the nominal primary and secondary fuel flow versus split flow divider valve stroke.
Figure 6:
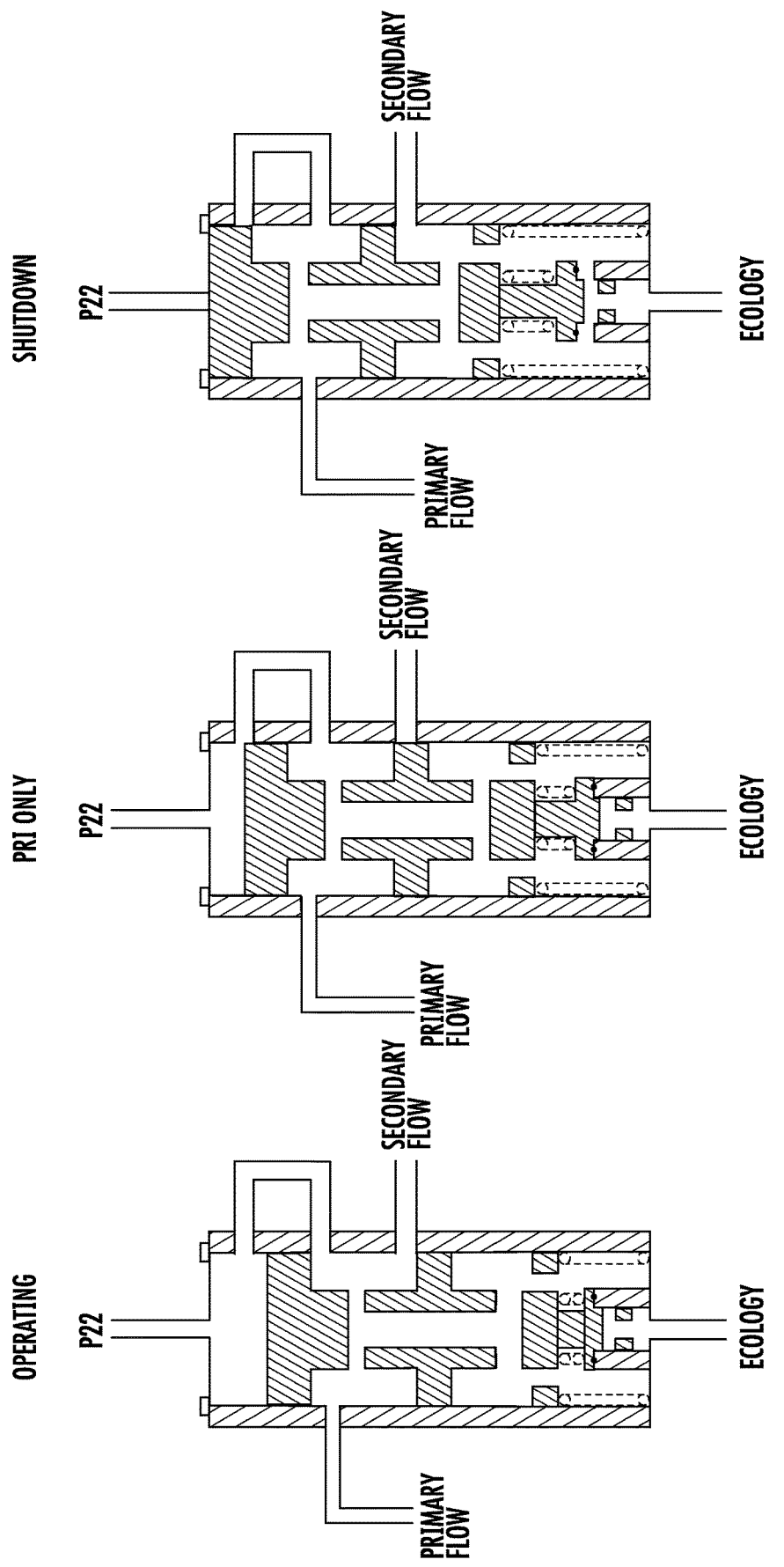
FIG. 6 illustrates a prior art split flow valve in three operating positions of Operating (supplying fuel to both primary and secondary fuel manifolds), Pri Only (supplying fuel to only the primary fuel manifold), and Shutdown (supplying fuel to neither primary nor secondary fuel manifolds).

With quick reference to FIGS. 4 and 5, this shutdown mode is shown as region 160 in the graphical illustration of mass flow rate to the primary manifold (Wf $P_{prime}$) and to the secondary manifold (Wf $P_{sec}$) versus primary piston (122) stroke.

Once the engine control system commands operation of the engine, and with reference now to FIG. 2, the fuel pump (not shown) begins to increase the fuel pressure to the inlet 136 of the FDV 102. This increasing pressure begins to overcome the force of spring 128 and stroke the primary piston 122 such that fuel is now capable of flowing to the primary manifold.

This initial increase of the fuel flow rate to the primary manifold (Wf $P_{prim}$) as the primary manifold port opening 104 is being metered is shown in FIGS. 4 and 5 as line segment 162.

However, once this primary manifold port opening 104 is fully opened (the condition depicted in FIG. 2), the Wf $P_{prim}$ remains relatively steady, i.e. does not appreciably increase at nearly the same rate as during segment 162 with increased fuel pressure (P22) or primary piston 122 stroke (beyond the position shown in FIG. 2 and before the position shown in FIG. 3). This generally plateaued region is shown in FIGS. 4 and 5 as the generally horizontal segment 164 during which Wf $P_{prime}$ may only increase 10-13 pph over the stroke distance of the primary piston 122 during this time.

This occurs as the increased fuel pressure resulting in further stroke of the primary piston 122 during this period is fed back via flow path 166 shown in FIG. 2. That is, flow path 166 initially is used to provide fuel flow to the primary manifold as it begins to open as the primary piston 122 strokes downwardly to the position shown in FIG. 2 (forming region 160 of FIGS. 4 and 5). However, further stroking of the primary piston 122 opens the flow path 167 on the opposite side of the FDV 102 shown in FIG. 2. Based on the relative sizing and metering of the two flow paths 166, 167 as the primary piston 122 continues to stroke downwardly, flow path 166 begins to act to feed back the fuel pressure such that the generally horizontal segment 164 of FIGS. 4 and 5 is formed despite the increasing stroke of primary piston 122. In other words, the increasing inlet pressure that results in increased stroke of primary piston 122 is mostly fed back to the inlet via flow path 166 instead of resulting in an equal increased pressure flowing to the primarily manifold via 137.

During the primary piston 122 stroke along line 164 (and until point 168 of FIGS. 4 and 5 is reached, to be discussed more fully below), the FDV 102 regulates to provide total flow to the primary manifold as the secondary piston 124 remains on the dual soft seals 130, 132 providing drop tight sealing between primary and secondary manifolds. This prevents coking in the secondary nozzles. During this time the transfer valve 108 control pressure (through restriction 140) is equal to $P_{sec}$ pressure and provides $P_{inlet}$ pressure as the control pressure to the back side of the ecology piston 110 (through restriction 146), keeping the ecology valve 112 in the un-charged state.

However, at point 168 shown best in FIG. 5, the primary piston 122 has contacted and begins to move the secondary piston 124 off seals 130, 132. Continued stroking of the primary piston 122 and secondary piston 124 will first provide P22 pressure through restriction 140 to the transfer valve 108. However, the configuration of the secondary piston 124 does not allow, i.e. does not begin metering, fuel flow to the secondary manifold until point 170 best shown in FIG. 5 is reached.

After this point 170, the Wf $P_{prime}$ begins to decrease and Wf $P_{sec}$ begins to increase as the total fuel flow is divided between the two manifolds. During this time the transfer valve 108 control pressure is becoming equal to P22 pressure through restriction 140 to begin to move piston 142 to the right. This ultimately provides P22 pressure as the control pressure to the ecology piston 110 to transition it to the charged state. The movement of piston 142 provides the inlet pressure $P_{inlet}$ to the back side of the ecology piston 110 to stroke it to the right. This movement of the ecology piston 110 provides the fuel in ecology volume 120 to the secondary manifold (and from volume 118 to the primary manifold) as shown in FIG. 3 during full operation mode.

In transitioning to the full operation mode, the inlet flow to the FDV 102 increases to initiate secondary flow. The force capability of the primary piston 122 is overcome and the first piston 122 becomes hydraulically locked to the secondary piston 124. When locked the two pistons 122/124 travel together as one and function very similar to a typical flow divider valve dividing flow between the two manifolds as a function of inlet flow. As mentioned briefly in the preceding description, upon cracking, i.e. movement of the secondary piston 124 off seals 130, 132, $P_{prim}$ pressure is ported to the transfer valve 108, which moves the piston 142 to provide P22 pressure to the control pressure side of the ecology piston 110 returning it to the charged position as shown in FIG. 3. The FDV 102 provides full manifold equalization at higher total flows.

Upon re-entering either the shutdown (FIG. 1) or the primary/low power (FIG. 2) mode of operation, i.e. when reducing fuel flow from the full operation mode of FIG. 3, the transfer valve 108 again provides $P_{inlet}$ control pressure to the ecology piston 110. This is because the secondary manifold pressure drops when the secondary piston 124 reseats against seals 130, 132 cutting off its fuel flow. The control pressure to the transfer valve 108 drops back through restriction 140 causing the transfer piston 142 to move back to the left. However, the rate of discharge for the ecology piston 110, i.e. movement to the left under force of spring 150, is restricted by restriction 146 to provide an amount of dampening needed meet the engine's needs and ultimately purging the secondary manifold fuel into ecology volume 120.

As may be seen most clearly in FIG. 5, the advanced two piston (122/124) FDV 102 of an embodiment of the present invention provides a consistent hysteresis loop depending on whether the fuel flow is increasing (as discussed above primarily with respect to line 164) or decreasing (discussion to follow with regard to dashed line 172). The hysteresis allows for two different engine operating modes, to wit, a second key operating mode between points 174 and 170 along dashed line 172 and the primary/low power mode to the left of point 170 along solid line 164 (until transition to line 162 where flow rate decreases with decreasing P22), to be commanded at the same overall fuel flow. That is, during the two modes the overall fuel flow rate (Wf $P_{prim}$ alone to the left of point 170 along line 164 during increasing flow from shutdown, or Wf $P_{prim}$ along dashed line 172+Wf $P_{sec}$ between points 174 and 170 during decreasing flow from full operation) is the same. The second key operating mode provides flow to the secondary manifold, and the primary/low power mode provides drip tight sealing and ecology of the secondary manifold. This is accomplished by approaching the second key operating mode from a higher flow (>110 pph), and entering primary/low power mode from a lower inlet flow (<50 pph).

With this understanding reference is again made to FIG. 4, which shows the full nominal primary (Wf $P_{prim}$) and secondary (Wf $P_{sec}$) flows schedule versus FDV 102 primary piston 122 stroke. The hysteresis loop enabling the two modes of operation is shown in solid line when entering it during increasing flow, i.e. from left to right, and in dashed line when entering it during decreasing flow, i.e. from right to left.

Also as discussed above, FIG. 5 is provided to focus on the region of the operating envelope associated with startup, transition to idle, and transition to primary/low power mode. The arrows on FIG. 5 pointing to the right highlight the direction of increasing flow as flow is increased through the primary only operating zone (to the left of point 168) then through the transition zone until point 170 to bring on secondary flow. As the FDV 102 translates through the transition zone, the primary piston 122 contacts the secondary piston 124 and pushes the secondary piston 124 off its sealed stop at point 168 and thereafter initiates secondary flow beginning at point 170. The primary and secondary pistons 122/124 travel together as one for all valve positions beyond point 168 and supply fuel to both the primary and secondary manifolds in the region that begins at point 170 and to the right.

The arrows that point to the left highlight the direction of decreasing flow as the FDV 102 pistons 122 and 124 travel back to primary/low power mode on a distinctly different schedule (dashed line 172) versus the increasing direction. As the hydro-locked pistons 122/124 travel back across secondary piston stop at point 168, the secondary piston 124 is seated and secondary manifold is again sealed from the primary manifold. As flow is further reduced, the primary piston 122 translates through the transition zone completing the hysteresis loop.

As will now be apparent, in the second key operating mode a metered flow is commanded that is equivalent to the primary/low power mode. However, because the direction of stroke is from high power, the FDV 102 does not close the secondary manifold. In the primary/low power mode, engine control system initially commands a very low fuel flow. This allows the secondary port opening 106 to close, and be drop tight sealed from the primary port opening 104, and the transfer valve inlet pressure is equal to $P_{sec}$ (or P3). This provides $P_{inlet}$ to the ecology piston 110 inlet, and charges the ecology piston 110 to purge the secondary manifold via line 116 into volume 120.

At shutdown when the engine is commanded off, the FDV 102 slews shut, and the ecology piston 110 purges both manifolds.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A passive flow splitting system for use in a turbine engine fuel control system to provide split fuel flow to a primary fuel manifold and a secondary fuel manifold to supply primary fuel injectors and secondary fuel injectors, respectively, for particular combustion zones thereof, comprising:
a passive fuel divider valve (FDV) configured to provide intentionally different split ratios dependent on ascending or descending fuel mass flow rate, the FDV including:
a housing having an inlet, a primary manifold port, a secondary manifold port, and a plurality of flow paths;
a primary piston in communication with the inlet; and
a secondary piston,
wherein the primary piston is moveable independently of the secondary piston to meter fuel flow from the primary manifold port to the primary manifold of the turbine engine fuel control system, and being biased away from the secondary piston,
wherein the secondary piston is configured to meter fuel flow from the secondary manifold port to the secondary manifold of the turbine engine fuel control system, and being biased to prohibit the fuel flow from the secondary manifold port, and
wherein the primary piston strokes with increasing fuel pressure to meter the fuel flow from the primary manifold port to the primary manifold, and contacts the secondary piston with the increasing fuel pressure to cause the secondary piston to meter the fuel flow from the secondary manifold port to the secondary manifold, the primary piston and the secondary piston being hydro-locked while there is contact between the primary piston and the secondary piston;
an ecology valve configured to reservoir fuel at least from the secondary manifold when the secondary piston of the FDV is positioned to prohibit fuel flow to the secondary manifold; and
a transfer valve configured to control a state of the ecology valve based on fuel pressure supplied to the secondary manifold by the FDV.

2. The passive flow splitting system of claim 1, wherein the ecology valve is further configured to reservoir fuel from the primary manifold when the primary piston of the FDV is positioned to prohibit fuel flow to the primary manifold.

3. The passive flow splitting system of claim 1, wherein the transfer valve is configured to alternatively supply inlet fuel pressure or fuel pump operating pressure to a control side of an ecology piston of the ecology valve to control a position of the ecology piston of the ecology valve.

4. The passive flow splitting system of claim 1, wherein the FDV is configured to provide a low power mode of operation that only supplies fuel to the primary manifold at a first rate, and to provide a second key operating mode of operation that supplies fuel to the primary manifold and to the secondary manifold at a combined second rate, the combined second rate being essentially equal to the first rate, and wherein the low power mode and the commanded second key operating mode each use the intentionally different split ratios depending on whether the engine is coming from a low power condition or a high power condition, such differences defining a flow rate hysteresis loop.

5. The passive flow splitting system of claim 4, wherein the secondary manifold is purged by the ecology valve while the FDV continues to supply fuel to the primary manifold in the low power mode in order to ensure secondary fuel injector nozzles supplied from the secondary manifold do not coke up due to continued presence of fuel during periods of continuing operation in the low power mode.

6. The passive flow splitting system of claim 1, wherein the primary piston is biased against a first seal by a first spring having a first spring force, such that as the inlet fuel pressure is increased at an inlet of the FDV the primary piston is stroked against the first spring force of the first spring to meter the flow of fuel to the primary manifold from the primary manifold port.

7. The passive flow splitting system of claim 6, wherein the FDV is configured to provide a bypass flow path operative once the primary manifold port is fully open to feed back fuel to the inlet of the FDV to provide a relatively steady fuel flow to the primary manifold during increasing inlet fuel pressure and primary piston stroke to form a generally plateaued region of fuel flow mass rate to the primary manifold.

8. The passive flow splitting system of claim 6, wherein the secondary piston is biased against a second seal and a third seal by a second spring having a second spring force greater that the first spring force, and wherein the FDV is configured to provide primary manifold fuel pressure through a restriction to a side of the secondary piston upon which the secondary spring force acts.

9. The passive flow splitting system of claim 8, wherein the FDV is configured such that with increasing inlet fuel pressure the primary piston continues to stroke until the primary piston contacts and begins to move the secondary piston off of the second and third seals, wherebeyond the primary piston and the secondary piston are hydro-locked.

10. The passive flow splitting system of claim 9, wherein the FDV is configured to provide the inlet fuel pressure through a restriction to the transfer valve before the hydro-locked primary piston and secondary piston meter fuel flow to the secondary manifold upon further stroking thereof in order to enable the transfer valve to control the ecology valve to charge the secondary manifold with fuel reservoired in the ecology valve.

11. A passive fuel divider valve (FDV) for use in a turbine engine fuel control system to provide split fuel flow to a primary fuel manifold and a secondary fuel manifold to supply primary fuel injectors and secondary fuel injectors, respectively, for particular combustion zones thereof, the FDV configured to provide intentionally different split ratios dependent on ascending or descending fuel mass flow rate, the FDV comprising:
a housing having an inlet, a primary manifold port, a secondary manifold port, and a plurality of flow paths;
a primary piston in communication with the inlet;
a secondary piston;
wherein the primary piston is moveable independently of the secondary piston to meter fuel flow from the primary manifold port to the primary manifold of the turbine engine fuel control system, and being biased away from the secondary piston;
wherein the secondary piston is configured to meter fuel flow from the secondary manifold port to the secondary manifold of the turbine engine fuel control system, and being biased to prohibit the fuel flow from the secondary manifold port, and
wherein the primary piston strokes with increasing fuel pressure at the inlet to meter the fuel flow from the primary manifold port to the primary manifold, and contacts the secondary piston with the increasing fuel pressure to cause the secondary piston to meter the fuel flow from the secondary manifold port to the secondary manifold, the primary piston and the secondary piston being hydro-locked while there is contact between the primary piston and the secondary piston.

12. The FDV claim 11, wherein plurality of flow paths, the primary piston, and the secondary piston are configured to provide a low power mode of operation that only supplies fuel to the primary manifold at a first rate, and to provide a second key operating mode of operation that supplies fuel to the primary manifold and to the secondary manifold at a combined second rate, the combined second rate being essentially equal to the first rate, and wherein the low power mode and the commanded second key operating mode each use the intentionally different split ratios depending on whether the engine is coming from a low power condition or a high power condition, such differences defining a flow rate hysteresis loop.

13. The FDV of claim 12, wherein the primary piston is biased against a first seal by a first spring having a first spring force, such that as an inlet fuel pressure is increased at the inlet of the housing the primary piston is stroked against the first spring force of the first spring to meter the flow of fuel to the primary manifold from the primary manifold port.

14. The FDV of claim 13, wherein one of the plurality of flow paths includes a bypass flow path operative once the primary manifold port is fully open to feed back fuel to the inlet of the housing to provide a relatively steady fuel flow to the primary manifold during increasing inlet fuel pressure and primary piston stroke to form a generally plateaued region of fuel flow mass rate to the primary manifold.

15. The FDV of claim 13, wherein the secondary piston is biased against a second seal and a third seal by a second spring having a second spring force greater that the first spring force, and wherein one of the plurality of flow paths provides primary manifold fuel pressure through a restriction to a side of the secondary piston upon which the secondary spring force acts.

16. The FDV of claim 15, wherein with increasing inlet fuel pressure the primary piston continues to stroke until the primary piston contacts and begins to move the secondary piston off of the second and third seals, wherebeyond the primary piston and the secondary piston are hydro-locked.

* * * * *